United States Patent [19]
Satoh

[11] Patent Number: 5,347,861
[45] Date of Patent: Sep. 20, 1994

[54] THERMAL MASS FLOW METER

[75] Inventor: Kiyoshi Satoh, Kyoto, Japan

[73] Assignee: Stec Inc., Kyoto, Japan

[21] Appl. No.: 20,224

[22] Filed: Feb. 16, 1993

Related U.S. Application Data

[63] Continuation of Ser. No. 737,716, Jul. 30, 1991, abandoned.

[30] Foreign Application Priority Data

Aug. 11, 1990 [JP] Japan .................. 2-212821

[51] Int. Cl.⁵ ............................................. G01F 1/68
[52] U.S. Cl. .............. 73/204.12; 73/204.18; 73/204.22
[58] Field of Search ........... 73/204.11, 204.12, 204.18, 73/204.19, 204.22, 204.25, 204.27

[56] References Cited

U.S. PATENT DOCUMENTS 3,187,569  6/1965  Los ..................... 73/204.12
4,440,021  4/1984  Abouchar ............ 73/204.27
4,686,856  8/1987  Vavra et al. ......... 73/204.15

FOREIGN PATENT DOCUMENTS 56-81421  7/1981  Japan .

Primary Examiner—Herbert Goldstein
Attorney, Agent, or Firm—Price, Gess, Ubell

[57] ABSTRACT

The portions on the sides far to each other of two sensor coils wound around the outer circumferential portion of the conduit, through which the fluid passes, at the suitable interval are thermally joined through a thermal conductor and the thermal conductor is heated by means of a heater, whereby the flow rate of fluid can be accurately measured without being influenced by the posture error resulting from the convection.

13 Claims, 3 Drawing Sheets

THERMAL MASS FLOW METER

This is a continuation of application Ser. No. 07/737,716, filed on Jul. 30, 1991 now abandoned.

BACKGROUND OF THE INVENTION

1. Field of the Invention

The present invention relates to an improvement of a thermal mass flow meter provided with a sensor portion formed by winding two sensor coils around an outer circumference of a conduit, through which a fluid passes, at a suitable interval.

2. Description of the Prior Art

In the conventional thermal mass flow meter, in order to reduce a posture error resulting from the convection, various kinds of device have been made.

That is to say, a device, in which two sensor coils 41, 42 wound around an outer circumference of a metallic conduit 40, through which a fluid passes, at a suitable interval and a conduit portion, around which said sensor coils 41, 42 are wound, are covered with an insulating cladding material 43 made of a material having a low heat conductivity and an insulating property, as shown in FIG. 4 (refer to Japanese Patent Publication No. Sho 56-23094), a device, in which the greater part of a metallic conduit 50, through which a fluid passes, two sensor coils 51, 52 wound around an outer circumference of said conduit 50 at a suitable interval are provided within a groove 54 having an equivalent diameter of 4 mm or less formed in a case (for example a metallic case) having a heat conductivity remarkably larger than that of air, as shown in FIG. 5 (refer to Japanese Patent Application Laid-Open No. Sho 59-88622), a device, in which both end portions of a metallic conduit 60, through which a fluid passes, and around of which outer circumference two sensor coils 61, 62 are wound at a suitable interval, are joined together by means of a belt-shaped film 63 superior in heat conductance to make said both end portions equal to each other in temperature, as shown in FIG. 6 (refer to U.S. Pat. No. 4,686,856), and the like have been known.

In addition, referring to FIG. 4, reference numerals 44, 45 designate bridge resistances composing a bridge circuit 46 together with said sensor coils 41, 42 and reference numerals 47, 48 designate output terminals. And, said bridge circuit as shown in FIG. 4 is formed also in FIG. 5 and FIG. 6.

However, in means shown in FIG. 4, a disadvantage has occurred in that a responsiveness is inferior since a heat capacity of said insulating cladding material 43 is large. In addition, in means shown in FIG. 5, a responsiveness can be improved to some extent since a heat radiated from the conduit 50 can be absorbed to some extent by said metallic case 53 but a response time-constant is 2 seconds, which is large, and said responsiveness is missing as well. And, in means shown in FIG. 6, although the responsiveness can be considerably improved in comparison with the former two means, a disadvantage occurs in that a heat from said sensor coil 61 is taken away by said film 63 and a heat exchange of the coil→a conduit wall→said fluid, which should properly occur, can not be smoothly conducted, whereby an output of a bridge circuit can not be increased in spite of an increase of a flow rate of the fluid to spoil a linearity between an output signal and said flow rate.

SUMMARY OF THE INVENTION

The present invention has been achieved paying attention to the above described matters and it is an object of the present invention to provide a thermal mass flow meter not only capable of reducing a posture error resulting from the convection but also superior in responsiveness and linearity between a flow rate and an output signal.

In order to achieve the above described object, a thermal mass flow meter according to the present invention is characterized in that portions on the sides far to each other of two sensor coils wound around an outer surface of a conduit are thermally joined through a thermal conductor and said thermal conductor is heated by means of a heater.

According to the above described characteristical construction, since two sensor coils are thermally joined to each other, said posture error resulting from the convection in a sensor portion can be reduced. And, since a distribution of heat in two sensor coils becomes sharp and a thermal stabilization is speeded up, a responsiveness is improved. In addition, since a fluid passing through said conduit is preliminarily heated by a leg portion of the thermal conductor provided outside of the sensor coil on the upstream side, a quantity of heat exchanged in said sensor portion can be reduced and thus said heat exchange of the sensor coil→the conduit wall→the fluid can be smoothly conducted also in the case where said flow rate of the fluid is increased, so that the linearity between the flow rate and said output signal can be improved and thus a range of flow rate, which can be measured, can be remarkably expanded.

DETAILED DESCRIPTION OF THE PREFERRED EMBODIMENTS

The preferred embodiments of the present invention will be below described with reference to the drawings.

Figure 1:
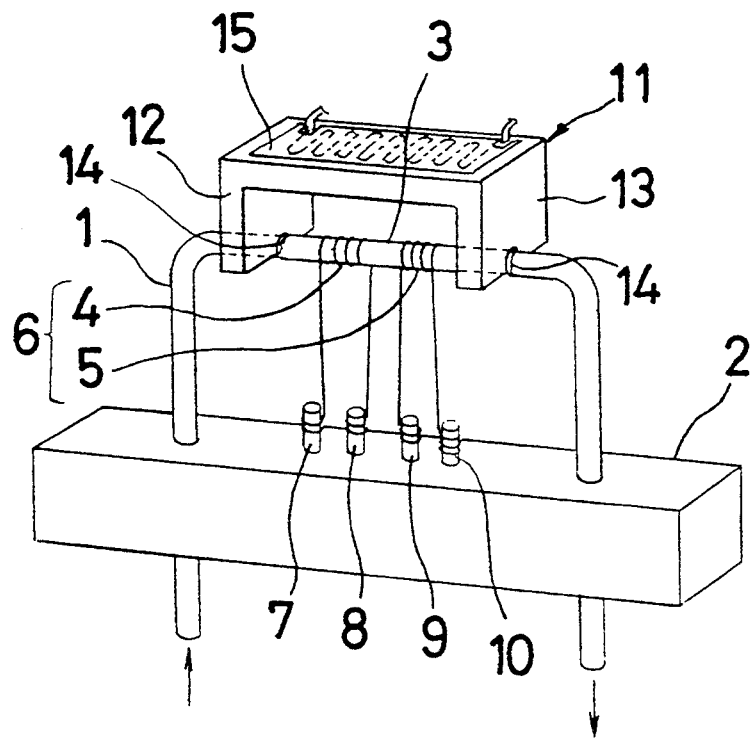
FIG. 1 is a perspective view showing main parts of a thermal mass flow meter according to one preferred embodiment of the present invention.

FIG. 1 shows one example of a thermal mass flow meter according to the present invention. Referring to FIG. 1, reference numeral 1 designates a conduit, through which a fluid passes in a direction shown by an arrow, made of a metal, such as stainless steel, superior in corrosion resistance and supported by inserting it through a base 2 made of stainless steel under an inverse U letter-shaped condition. A horizontal portion of said conduit 1 is provided with a sensor portion 6 comprising two sensor coils 4, 5. That is to say, said sensor coils 4, 5 are formed of for example a heat sensitive resistance wire and wound around an outer circumferential portion of the conduit 1 so as to be electrically isolated from but thermally joined to the conduit 1 and have a suitable interval between them. Reference numerals 7, 8 and 9, 10 designate intermediate terminals, with which both ends of the sensor coils 4, 5 are connected, respectively, connected with a bridge circuit (not shown). In addition, there is no difference between the above described construction and that of the conventional thermal mass flow meter of this type.

Reference numeral 11 designates a thermal conductor made of a material, such as a metal, for example aluminum, copper and gold, and alumina, superior in thermal conductivity with a nearly U letter-shaped cross section for bridging over portions on the sides far to each other of two sensor coils 4, 5 wound around said outer circumferential portion of the conduit 1 to thermally join them so that concave portions (not shown) formed in leg portions 12, 13 on both sides thereof may put the conduit 1 between them. And, adhesives 14 with particles made of a metal, such as silver and copper, mixed therein superior in thermal conductivity are applied in said concave portions.

Reference numeral 15 designates a heater composed of for example a plate heater for heating said thermal conductor 11 so as to for example be brought into contact with said horizontal portion 3 of the thermal conductor 11. And, said heater 15 is connected with a power source including a temperature-controlling circuit (not shown) so that the thermal conductor 11 may be heated always at an appointed temperature (for example room temperature or more).

In addition, although it is not shown, the conduit 1, the sensor coils 4, 5, the heater 15 and the like, which are provided above said base 2, are covered with a case made of a metal or a resin.

And, in said thermal mass flow meter having the above described construction, two sensor coils 4, 5 are thermally joined to each other by means of the thermal conductor 11 heated by the heater 15, so that a posture error resulting from the convection in said sensor portion 6 can be reduced. And, since a distribution of heat in both sensor coils 4, 5 became sharp and a thermal stabilization was speeded up, a response time-constant became about 0.2 seconds, that is a responsiveness was remarkably improved. In addition, since said fluid passing through the conduit 1 is preliminarily heated by said leg portion 12 of the thermal conductor 11 provided outside of the sensor coil on the upstream side (the sensor coil 4 in the preferred embodiment shown), a quantity of heat to be exchanged in the sensor portion 6 can be reduced and thus a heat exchange of the sensor coil→the conduit wall→the fluid can be smoothly conducted also in the case where a flow rate of the fluid is increased, so that a linearity between said flow rate and an output signal can be improved and thus a range of flow rate, which can be measured, can be remarkably expanded.

Figure 2:
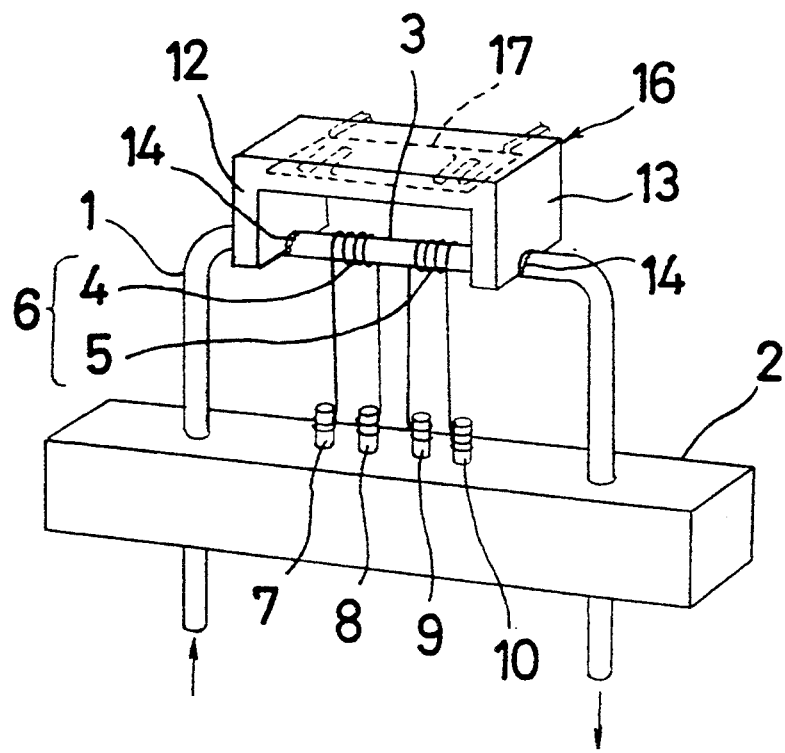
FIG. 2 and FIG. 3 is a perspective view showing main parts of a thermal mass flow meter according to another preferred embodiment, respectively.
Figure 3:
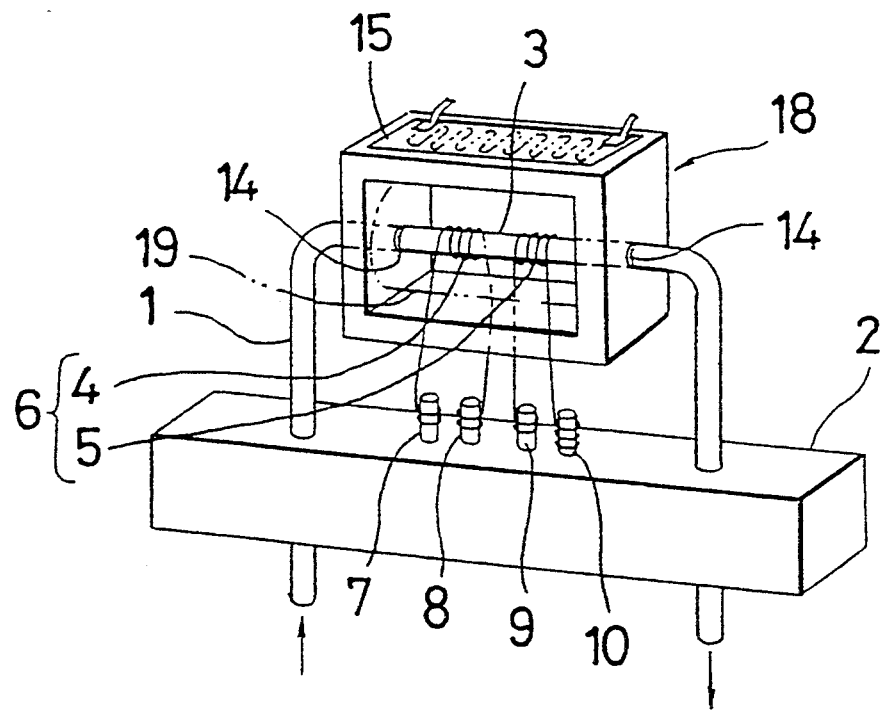
Figure 4:
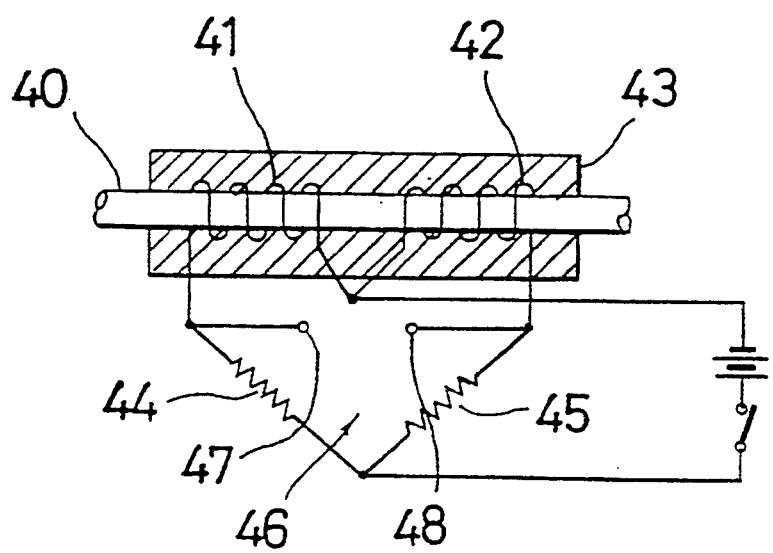
FIGS. 4 to 6 are drawings showing the conventional examples.
Figure 5:
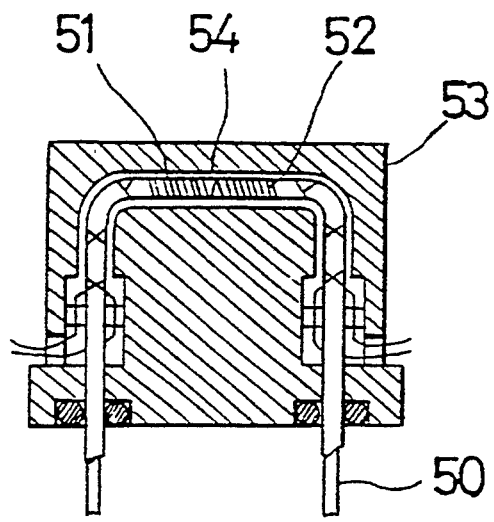
Figure 6:
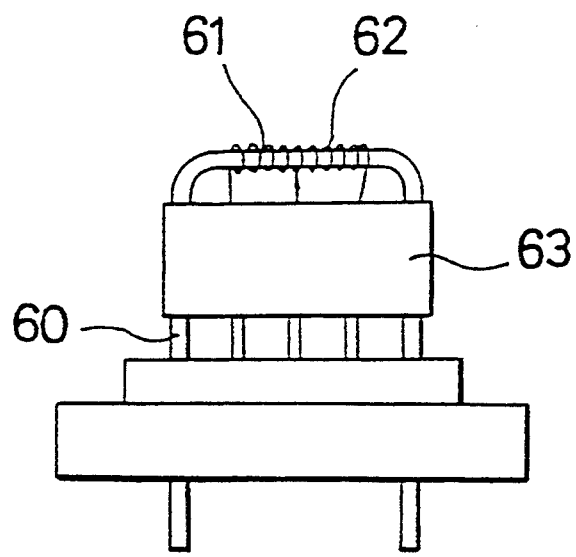

FIG. 2 and FIG. 3 shows another preferred embodiment of the present invention, respectively. In the preferred embodiment shown in FIG. 2, a heater 17 is included in a thermal conductor 16 which can be made of ceramics. In addition, in the preferred embodiment shown in FIG. 3, said thermal conductor 11 shown in FIG. 1 is provided also below a conduit 1 to form a cylindrical thermal conductor 18 on the whole and a glass fiber sheet 19 is provided between said cylindrical thermal conductor 18 and said conduit 1. It goes without saying that effects similar to those in the preferred embodiment shown in FIG. 1 can be exhibited also in these preferred embodiments. In particular, in the preferred embodiment shown in FIG. 3, a posture error can be still more reduced.

Since the present invention has the above described construction, the thermal mass flow meter according to the present invention is not only capable of accurately measuring the flow rate of fluid but also superior in responsiveness and capable of remarkably improving the linearity between the flow rate and the output signal in comparison with that in the conventional thermal flow meters of this type, so that the range of flow rate, which can be measured, can be expanded.

What is claimed is:

1. A thermal mass flow meter, comprising:
   a conduit;
   a fluid passing through the conduit;
   a sensor portion formed by winding a first sensor coil around an outer circumferential portion of the conduit and winding a second sensor coil around the outer circumferential portion of the conduit at an interval along the conduit;
   a thermal conductor for thermally connecting the first and second sensor coils by thermally contacting the conduit next to the sensor coils at points along the conduit external of the interval between the sensor coils, the thermal conductor being a bridge having first and second leg members and a horizontal member connected between the leg members, the leg members contacting the conduit at points proximate to the sensor coils external of the interval; and
   a heater for heating the thermal conductor, the heater maintaining the temperature of the thermal conductor at a constant temperature.

2. A thermal mass flow meter as claimed in claim 1, wherein the leg members have concave portions to provide thermal contact to the conduit.

3. A thermal mass flow meter as claimed in claim 1, wherein the contact between the leg members and the conduit includes a metallic adhesive means for enhancing thermal conductivity.

4. A thermal mass flow meter as claimed in claim 1, wherein the heater is a plate heater affixed at the horizontal member of the thermal conductor.

5. A thermal mass flow meter as claimed in claim 1, further including a case means for surrounding the conduit, the sensor coils, the thermal conductor and the heater, the case means including a metal.

6. A thermal mass flow meter as claimed in claim 1, further including a case means for surrounding the conduit, the sensor coils, the thermal conductor and the heater, the case means including a resin.

7. A thermal mass flow meter, comprising:
   a conduit;
   a fluid passing through the conduit;
   a sensor portion formed by winding a first sensor coil around an outer circumferential portion of the conduit and winding a second sensor coil around the outer circumferential portion of the conduit at an interval along the conduit;
   a thermal conductor for thermally connecting the first and second sensor coils by thermally contacting the conduit next to the sensor coils at points along the conduit external of the interval between the sensor coils, the thermal conductor having first and second leg members and first and second horizontal members connected between the leg members, the leg members contacting the conduit at points along the conduit proximate to the sensor coils external of the interval; and
   a heater for heating the thermal conductor, the heater maintaining the temperature of the thermal conductor at a constant temperature.

8. A thermal mass flow meter as claimed in claim 7, wherein the leg members have circular portions to provide thermal contact to the conduit.

9. A thermal mass flow meter as claimed in claim 7, wherein the heater is a plate heater affixed at one of the horizontal members of the thermal conductor.

10. A thermal mass flow meter as claimed in claim 7, further including a glass fiber sheet provided between the cylindrical thermal conductor and the conduit.

11. A thermal mass flow meter as claimed in claim 7, further including a case means for surrounding the conduit, the sensor coils, the thermal conductor and the heater, the case means including a metal.

12. A thermal mass flow meter as claimed in claim 7, further comprising a case means for surrounding the conduit, the sensor coils, the thermal conductor and the heater, the case means including a resin.

13. A thermal mass flow meter, comprising:
a conduit;
a fluid passing through the conduit;
a sensor portion formed by winding a first sensor coil around an outer circumferential portion of the conduit and winding a second sensor coil around the outer circumferential portion of the conduit at an interval along the conduit and downstream of the first sensor coil;
a thermal conductor for thermally connecting the first and second coils by thermally contacting the conduit next to the sensor coils at points along the conduit external of the interval between the sensor coils, the thermal conductor having first and second leg members and first and second horizontal members connected between the leg members, the leg members contacting the conduit at points along the conduit proximate to the sensor coils external of the interval;
a metallic adhesive connecting the first and second leg members to the conduit for providing enhanced thermal conductivity, the first leg member connected upstream of the first sensor coil, and the second leg member connected downstream of the second sensor coil, the first horizontal member connected to the respective first and second leg members on one side of the conduit, and the second horizontal member connected to the respective first and second leg members on the opposite side;
a heater plate mounted on one of the horizontal members for heating the thermal conductor to at least room temperature, the heater maintaining the temperature of the thermal conductor at a constant temperature; and
a case means for surrounding the conduit, the first and second sensor coils, the thermal conductor, and the heater plate, the case means including a glass fiber sheet between the conduit and the thermal conductor.

* * * * *